(12) United States Patent
Wrenninge et al.

(10) Patent No.: US 10,235,601 B1
(45) Date of Patent: Mar. 19, 2019

(54) METHOD FOR IMAGE ANALYSIS

(71) Applicant: 7D Labs, Inc., San Francisco, CA (US)

(72) Inventors: Carl Magnus Wrenninge, San Francisco, CA (US); Carl Jonas Magnus Unger, San Francisco, CA (US)

(73) Assignee: 7D Labs, Inc., San Francisco, CA (US)

( * ) Notice: Subject to any disclaimer, the term of this patent is extended or adjusted under 35 U.S.C. 154(b) by 0 days.

(21) Appl. No.: 16/124,378

(22) Filed: Sep. 7, 2018

Related U.S. Application Data

(60) Provisional application No. 62/571,422, filed on Oct. 12, 2017, provisional application No. 62/555,202, filed on Sep. 7, 2017.

(51) Int. Cl.
*G06K 9/62* (2006.01)

(52) U.S. Cl.
CPC .................................. *G06K 9/6256* (2013.01)

(58) Field of Classification Search
CPC ......................................... G06K 9/6217–9/6265
See application file for complete search history.

(56) References Cited

U.S. PATENT DOCUMENTS

| | | | |
|---|---|---|---|
| 9,305,394 B2 * | 4/2016 | Wachter | G06T 15/06 |
| 2007/0046686 A1 * | 3/2007 | Keller | G06F 17/10 345/581 |
| 2009/0141026 A1 * | 6/2009 | Raab | G06T 11/001 345/424 |
| 2014/0023282 A1 * | 1/2014 | Keller | G06K 9/6218 382/225 |
| 2018/0060701 A1 * | 3/2018 | Krishnamurthy | G06K 9/6269 |
| 2018/0307947 A1 * | 10/2018 | Choi | G06K 9/6259 |

\* cited by examiner

*Primary Examiner* — Wesley J Tucker
(74) *Attorney, Agent, or Firm* — Jeffrey Schox; Diana Lin

(57) ABSTRACT

A method for synthetic data generation and analysis including: determining a set of parameter values; generating a scene based on the parameter values; rendering a synthetic image of the scene; and generating a synthetic dataset including a set of synthetic images.

20 Claims, 5 Drawing Sheets

METHOD FOR IMAGE ANALYSIS

CROSS-REFERENCE TO RELATED APPLICATIONS

This application claims the benefit of U.S. Provisional Application Ser. No. 62/555,202, filed 7 Sep. 2017, and U.S. Provisional Application Ser. No. 62/571,422, filed 12 Oct. 2017, which are each incorporated herein in their entirety by this reference.

TECHNICAL FIELD

This invention relates generally to the image analysis field, and more specifically to a new and useful method for generating and utilizing synthetic data in the image analysis field.

BACKGROUND

Large datasets are important for implementing machine learning (ML) solutions. In particular, many methods use models having large numbers of parameters, which often require large amounts of data for optimization. Supervised learning relies upon these large datasets being explicitly labeled. However, labeling the data is typically performed with a human in the loop, whether partially (e.g., checked) by human or performed entirely manually by a human. This aspect can make the generation of suitable datasets time consuming and expensive. Furthermore, labeled datasets that are collected from real world scenarios are subject to the random nature of real world events. Accordingly, collecting real-world datasets with suitable coverage of the parameter space underlying a model can be prohibitively time consuming and complex, and in many cases the coverage is difficult to quantify or determine precisely. In addition, methods for producing synthetic datasets to mitigate issues with real datasets often employ a virtual world (e.g., a single virtual world, a limited number of holistically-generated virtual worlds, etc.) in which a virtual camera positioned and used to generate synthetic images. However, this approach can yield datasets where some environmental parameters are constant or inadequately varied throughout, due to the limited nature of the virtual world. The resultant datasets can also suffer from: poor image quality, poor realism (e.g., manifesting as a large "domain shift" between the real and synthetic images), requiring "fine tuning" (e.g., training on synthetic, then real, images to fine tune the neural networks, adjusting the training data manually to improve performance, etc.), one-off virtual world creation (e.g., generalized scene configurations corresponding to an explorable virtual world instead of unique scene configurations), and insufficient parameter variation (e.g., varying too few image parameters, such as time of day, weather, etc.) Often, the architecture of computational paradigms for generating typical virtual worlds (e.g., gaming engines) do not adequately generate wide and efficient variability over the underlying parameter space, due to the divergence between the needs of common use cases (e.g., game play) and those of synthetic datasets for ML model use.

Thus, there is a need in the field to create a new and useful method of generating synthetic image datasets depicting simulated real-world imagery, that are intrinsically labeled, and efficiently cover the parameter space underlying machine learning models. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
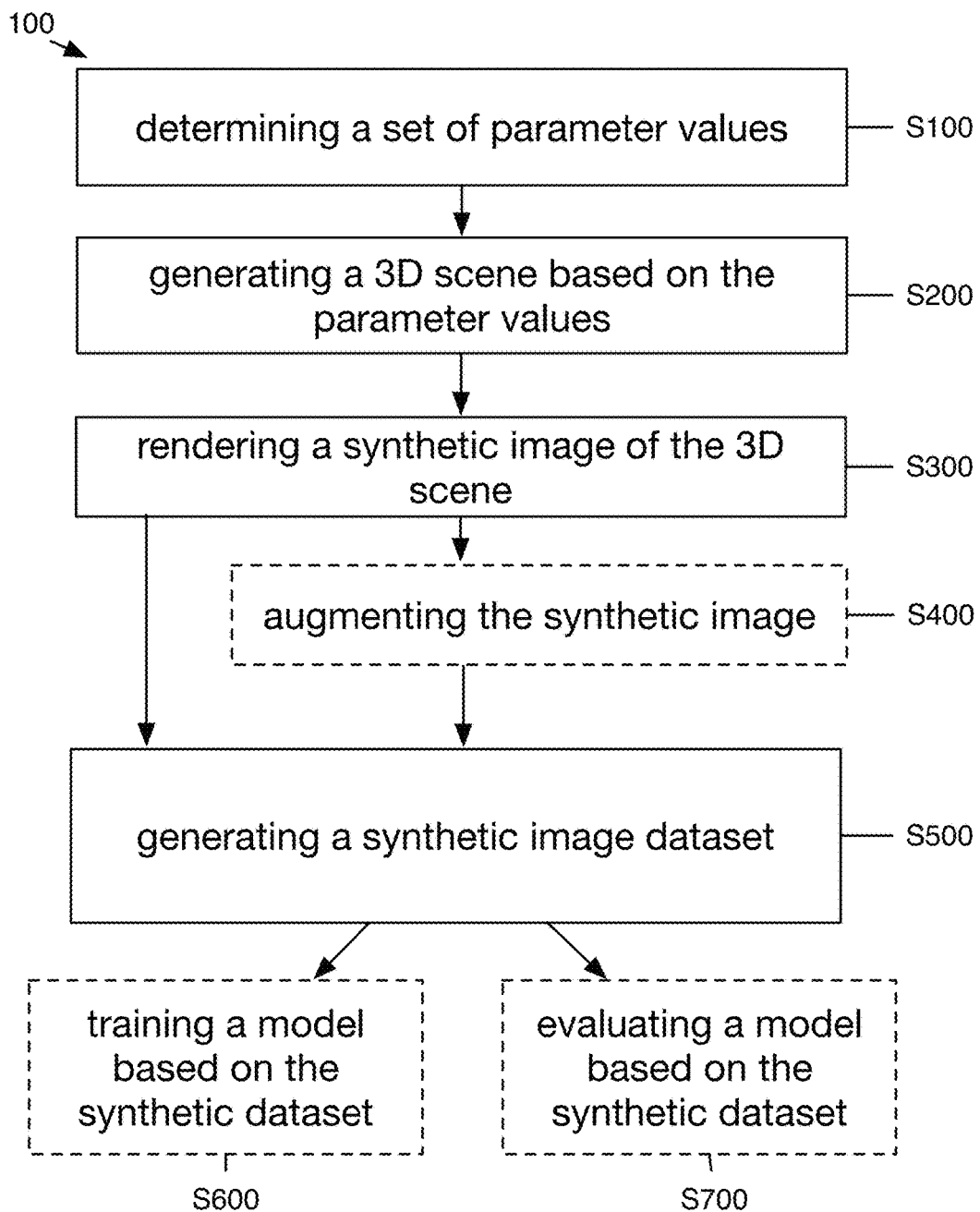
FIG. 1A depicts a flowchart of an example implementation of the method.
Figure 1B:
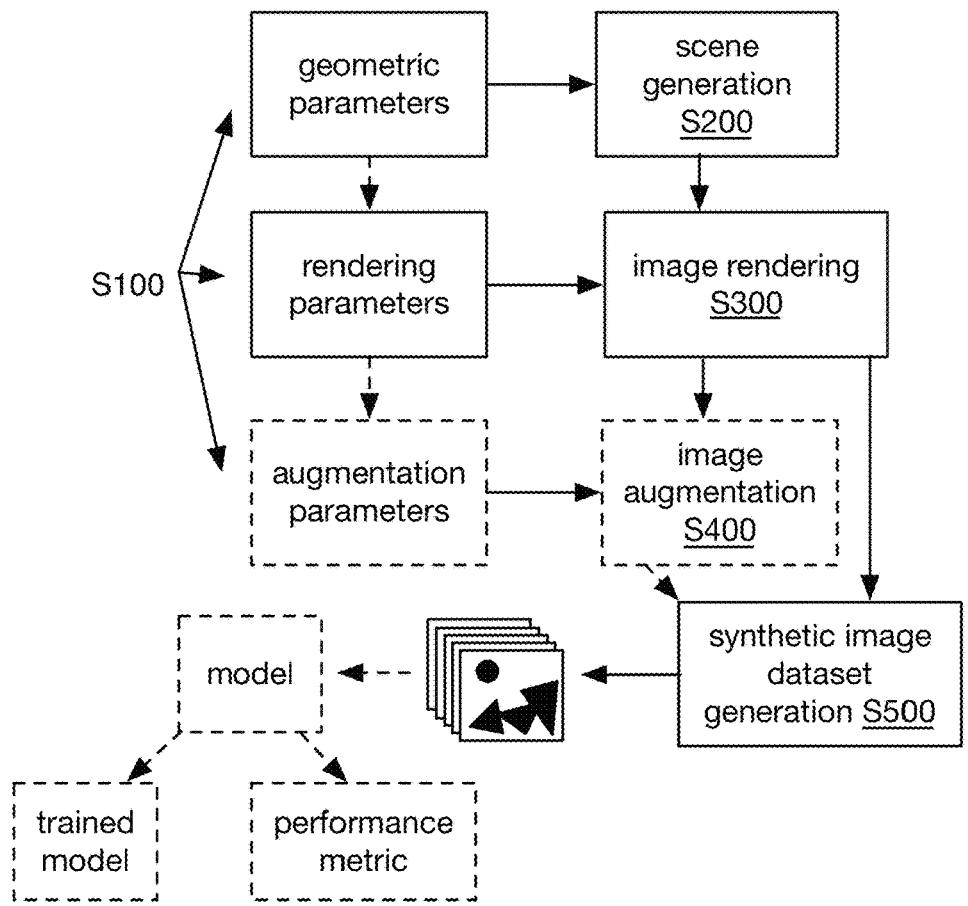
FIG. 1B depicts a schematic diagram of an example implementation of the method.

As shown in FIGS. 1A-1B, the method 100 can include: determining a set of parameter values associated with at least one of a set of geometric parameters, a set of rendering parameters, and a set of augmentation parameters S100; generating a three dimensional (3D) scene based on the set of geometric parameters S200; rendering a synthetic image of the scene based on the set of rendering parameters S300; and, generating a synthetic image dataset S500. The method can additionally or alternatively include: augmenting the synthetic image based on the set of augmentation parameters S400; training a model based on the synthetic image dataset S600; evaluating a trained model based on the synthetic image dataset S700; and/or any other suitable method blocks or subprocesses.

The method 100 functions to generate synthetic data that is suited (e.g., optimally suited, adapted to optimize model convergence and/or accuracy, etc.) to image-based machine learning (e.g., computer vision models, vehicle control models, classification models, mission planning models, etc.). The images can include optical images, but can additionally or alternatively include other suitable data that is representable as a projection of a three-dimensional (3D) space (e.g., LIDAR, radar, point clouds, etc.). The method 100 can also function to maximize the coverage (e.g., of a multidimensional parameter space; e.g., how many different kinds of scenarios or types of objects are in a set of images, such as whether there is a child crossing the street behind a bus) and variation within a scene (i.e., a virtual 3D space; e.g., distribution, or how many different instances are present across all categories represented in the coverage, such as whether the dataset includes a child crossing the street behind the bus in the morning, evening, and night) given a set of parameters that control the creation of a 3D scene and virtual image generation of the 3D scene. The method 100 can also function to procedurally generate the geometry of street scenes for capture via synthetic imagery (e.g., images of the virtual street scenes). The method 100 can also function to maximize the coverage of a multidimensional parameter space that defines rendering and/or augmentation of images depicting a 3D scene. The method 100 can also function to generate a synthetic dataset for provision to a third party (e.g., a developer of machine image classification models, a tester of computer vision models, a creator of vehicle control models based on image analysis, etc.). However, the method 100 can additionally or alternatively have any other suitable function in relation to synthetic data generation and/or analysis.

The method 100 is preferably performed by, executed at, and/or implemented at a computing system. The computing system can include a remotely interconnected set of computing modules (e.g., a cloud based computing system, one or more CPUs, one or more GPUs, etc.). Additionally or alternatively, the computing system can include a vehicle computing system (e.g., a vehicle ECU, central vehicle computer, etc.). However, the method can be otherwise implemented at any suitable computing system and/or network of computing systems.

The method 100 can have several applications. In a first example application, the method can be used to train a new model (e.g., a machine learning model) for image analysis (e.g., classification of objects in images, determination of the properties of objects in images, etc.). In a second example application, the method can be used to improve and/or augment a model that has been previously trained on real-world, "organic" data (i.e., not synthetic) with additional data volume derived from synthetic data. In a third example application, the method can be used to validate a trained model (e.g., after model generation and/or training) for consistency (e.g., to demonstrate that the model will perform predictably when previously unseen data is provided as a model input) and/or accuracy (e.g., to benchmark the model output against known ground truth data, either intrinsically known from the synthetic data, manually generated for real-world data, or otherwise suitably obtained). However, the method 100 can have any other suitable applications.

Inputs to the method can include user preferences (e.g., a set of parameters relevant for training a machine learning model), a geographic location identifier (e.g., a location associated with known parameter values or ranges of parameter values), a temporal identifier (e.g., a time of day associated with known parameter values or ranges of parameter values), and any other suitable inputs. Output of the method preferably includes a synthetic dataset that includes realistic (e.g., closely approximating the real-world), intrinsically labeled (e.g., during procedural generation of the dataset) images for training and/or evaluating the performance of image-based machine learning models. The method can additionally or alternatively output three-dimensional scenes, four-dimensional scenes (e.g., a time series of 3D scenes), and any other suitable outputs.

2. Benefits

Variants of the method can afford several benefits and/or advantages. First, variants of the method can generate large numbers of different images that maximize the coverage of the dataset (e.g., the number of different types of scenarios, scenes, and/or object types that are in the set of images, the coverage of the dataset over the span of the multidimensional parameter space underlying the dataset, etc.) given the number of images and a set of parameters to vary within the number of images. Whereas real-world datasets can have indeterminate coverage and/or coverage that is difficult to quantify, variants of the method automatically produce synthetic datasets having maximal coverage that is explicitly quantified. In addition, variants of the method include generating a unique scene for each synthetic image (instead of changing the viewpoint of a virtual camera within a single scene to generate a series of images) in order to efficiently cover the parameter space of the virtual domain. Accordingly, variations of the method maximize parametric variation within a finite-size dataset. Whereas image creation (e.g., in film, in animation, etc.) in conventional solutions typically aims to produce a sequence of temporally correlated or otherwise related images (e.g., an animation, a gameplay environment, etc.), variations of the method 100 afford the benefit of producing synthetic datasets including images that are maximally diverse across the set of variable parameters underlying image production and thus of particular use in the context of ML models that learn optimally from diverse data.

Figure 5:
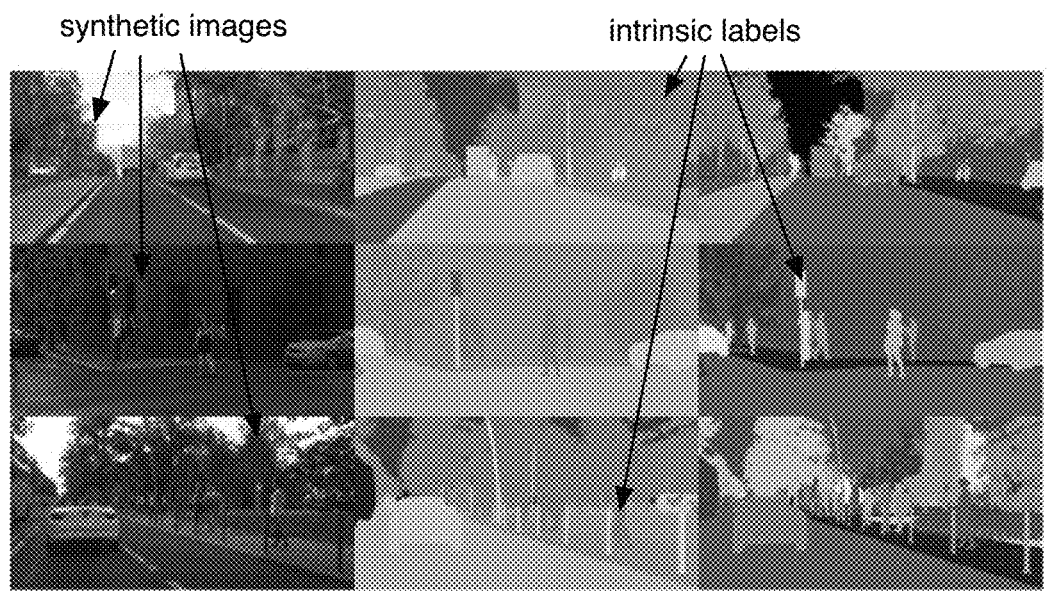
FIG. 5 depicts an example of intrinsic semantic segmentation of output synthetic images of an example implementation of the method.

Second, variants of the method result in labels of objects (and poses of such objects) within synthetic images that are inherently "perfect" (e.g., as accurate as possible) without human or other manual intervention (e.g., human-derived object or pose labels), because object types, layouts, relative orientations and positions are deterministic and known due to programmatic (e.g., procedural) generation of the virtual scene containing the objects. For example, hand-annotated data in conventional, manually-generated labeled datasets can fail to train ML models (e.g., networks) to recognize objects that are not correctly annotated in the ground-truth datasets (e.g., the hand-annotated datasets), whereas an intrinsically-labeled, procedurally generated synthetic dataset generated in accordance with variants of the method 100 are programmatically prevented from containing annotation errors. FIG. 5 depicts an example of pixel-by-pixel segmentation (e.g., intrinsic labeling) of synthetic images based on the underlying objects and/or groups of objects. Intrinsically labeled data can also be used, in examples, for validation of models, for exploration of novel ML architectures, and for analysis of trained models.

Third, variants of the method generate high quality images that depict realistic road scenes, which minimizes the "domain shift" between the synthetic image dataset and real-world images. The result of training a model using a synthetic dataset having minimal domain shift from real-world datasets is a trained model that performs significantly better when implemented using real-world data, but that can also be efficiently trained using automatically generated synthetic data. In addition, variants of the method can enable the elimination or reduction of fine tuning in cases wherein a model is trained on synthetic data, and then subsequently using real-world data to tune model behavior (e.g., outputs of the model) to the target domain. In conventional approaches, neither weight initialization nor fine tuning can sufficiently mitigate domain shift of datasets with poor realism. In contrast, variants of the method 100 can be used to produce high quality synthetic data wherein the realism is engineered directly into the data itself via procedural control of aspects of realism (e.g., orthogonal aspects of realism) including overall scene composition, geometric structure, illumination by light sources, material properties, optical effects, and any other suitable aspects of image realism.

Fourth, variants of the method can enable testing and validation of previously-trained models. Synthetic datasets generated via the method can provide consistent, well-labeled testing and validation datasets against which a model (e.g., a neural network) can be run (e.g., have the synthetic data provided as inputs) repeatedly to ensure that its performance characteristics (e.g., outputs, classification accuracy, recognition accuracy, etc.) stay within an expected range, which can allow regression testing (and other tests) to be performed.

Fifth, variants of the method can enable performance analysis of models. Models (e.g., neural networks, convolutional neural networks, deep learning networks, other ML networks, etc.) trained on real-world data can be difficult to analyze, due to unpredictability of the trained model parameters. When synthetic datasets generated via the method are provided to such models, the parameter set associated with each of the synthetic images (e.g., predetermined and known parameter values for each parameter used to generate the synthetic images) can provide insights into the states (e.g., the collection of parameter values and ranges thereof) and combinations thereof for which a model performs appropriately (e.g., classifies accurately) and for which it does not. This performance data can be used to tune the model, to seek out additional real world data having specified parameters based on the results of the performance analysis, or for any other suitable purpose.

Sixth, variants of the method can reduce or prevent overfitting of learning networks (e.g., neural networks) by performing data augmentation (e.g., during or prior to training) in a manner that minimizes undesirable correlation between augmented samples (e.g., that can arise from randomly applying data augmentation). For example, synthetic images can be augmented (e.g., scaled, translated, brightened, and/or darkened, etc.) by a parameterized factor, for which the value (e.g., for each image, for each sample, etc.) is determined by sampling a low-discrepancy sequence (LDS). Additionally or alternatively, undesirable correlation between any successive steps of synthetic image production can be minimized by parametrizing variables that vary between the successive steps and sampling the variables from an LDS (e.g., choosing which of a plurality of generated scenes is used for rendering based on a selection parameter sampled from an LDS) to provide the benefit of minimizing correlation between generation steps.

Seventh, variants of the method can split processing into multiple stages to maximize computational efficiency by separating independent synthetic image generation subprocesses. For example, adjusting a camera exposure parameter during image augmentation (e.g., in accordance with one or more variations of Block S400) does not affect the flow of photons in a scene (e.g., determined during rendering the image in accordance with one or more variations of Block S300) or the placement of vehicle objects (e.g., determined during programmatic scene generation in accordance with one or more variations of Block 200), and thus can be efficiently performed at a later stage of the generation and analysis process.

Eighth, variants of the method can confer improvements in computer-related technology (e.g., image processing, image generation, image analysis, computer vision, vehicle control models, etc.) by leveraging non-generic, realistic synthetic image data (e.g., generated in accordance with one or more variations of the method), In examples, the technology can confer improvements in the application of such technology by enabling efficient (e.g., computationally efficient, temporally efficient, etc.) and/or accurate model training or evaluation performance exceeding that of real-image data alone or instead.

Ninth, variants of the method can provide technical solutions necessarily rooted in computer technology (e.g., classifying objects in images according to machine classification rules and/or models, extracting semantic information from images, etc.) to overcome issues specifically arising with computer technology (e.g., overfitting issues, convergence issues, inadequate synthetic data issues, insufficient training data issues, etc.). In another example, the method can include applying computer-implemented rules (e.g., parameter sampling rules to minimize undesirable auto- and cross-correlation between variables etc.).

Tenth, variants of the method can confer improvements in the functioning of computational systems themselves. For example, the method can improve upon the processing of generated synthetic data (e.g., by intrinsically labeling the objects depicted in synthetic image to speed convergence of trained models to accurate outputs and reduce computational and/or manual labeling expense).

However, the method and variants thereof can afford any other suitable benefits and/or advantages.

3. Method

As shown in FIGS. 1A-1B, the method 100 can include: determining a set of parameter values associated with at least one of a set of geometric parameters, a set of rendering parameters, and a set of augmentation parameters S100; generating a three dimensional (3D) scene based on the set of geometric parameters S200; rendering a synthetic image of the scene based on the set of rendering parameters S300; augmenting the synthetic image based on the set of augmentation parameters S400; and, generating a synthetic image dataset S500. The method can additionally or alternatively include: training a model based on the synthetic image dataset S600; evaluating a trained model based on the synthetic image dataset S700; and/or any other suitable method blocks or subprocesses.

The method 100 functions to generate synthetic data that is suited (e.g., optimally suited, adapted to optimize model convergence and/or accuracy, etc.) to image-based machine learning (e.g., computer vision models, vehicle control models, classification models, mission planning models, etc.). The images can include optical images, but can additionally or alternatively include other suitable data that is representable as a projection of a three-dimensional (3D) space (e.g., LIDAR, radar, point clouds, etc.). The method 100 can also function to maximize the coverage (e.g., of a multidimensional parameter space) and variation within a scene (i.e., a virtual 3D space) given a set of parameters that control the creation of a 3D scene and virtual image generation of the 3D scene. The method 100 can also function to procedurally generate the geometry of street scenes for capture via synthetic imagery (e.g., images of the virtual street scenes). The method 100 can also function to maximize the coverage of a multidimensional parameter space that defines rendering and/or augmentation of images depicting a 3D scene. The method 100 can also function to generate a synthetic dataset for provision to a third party (e.g., a developer of machine image classification models, a tester of computer vision models, a creator of vehicle control models based on image analysis, etc.). However, the method 100 can additionally or alternatively have any other suitable function in relation to synthetic data generation and/or analysis.

3.1—Defining and Sampling Parameter Space

Block S100 includes determining a set of parameter values associated with at least one of a set of geometric parameters, a set of rendering parameters, and a set of augmentation parameters. Block S100 functions to define the parametric rule set for 3D scene generation, image rendering, and image augmentation. Block S100 can also function to maximize coverage of a parameter space associated with a parameter (e.g., by sampling the value of the parameter from an LDS) given a finite number of samples (e.g., synthetic images, data samples, etc.). Block S100 can also function to sample the parameter space that can define a virtual three-dimensional scene made up of instances of object classes, wherein the parameter space can be infinite, semi-infinite, discretely infinite, or finite, in an efficient manner that enables substantially maximal coverage of the parameter space (e.g., given a finite number of samples, with each incremental sample, etc.). Block S100 is preferably implemented by a computing system, but can additionally or alternatively be implemented using any other suitable component.

In relation to Block S100, all aspects of the individual object classes, such as geometry, materials, color, and placement can be parameterized, and a synthesized image and its corresponding annotations (e.g., of each instance of an object class in a virtual scene) represent a sampling of that parameter space (e.g., multidimensional parameter space). Furthermore, aspects of the image rendering and post-rendering augmentation of the image can be parameterized, and the sampling of these parameterized aspects (e.g., to generate rendering parameter values, augmentation parameter values, etc.) can represent the sampling of that parameter space and/or further dimensions of the parameter space defining aspects of the object classes in a virtual scene.

Block S100 is preferably performed multiple times within an iteration of the method 100 (e.g., between other Blocks of the method). For example, the method can include: determining a set of geometric parameters and sampling corresponding values, and generating a 3D scene based on the values of the geometric parameters; subsequently determining a set of rendering parameters and sampling corresponding values, and rendering an image of the 3D scene based on the values of the rendering parameters; and subsequently determining a set of augmentation parameters and sampling corresponding values, and augmenting the image of the 3D scene based on the values of the augmentation parameters. Block S100 can additionally or alternatively be performed a single time within an iteration of the method 100: for example, the method can include determining and sampling a multidimensional parameter space that includes geometric parameters, rendering parameters, and augmentation parameters prior to scene generation, rendering, and/or augmentation. However, Block S100 can additionally or alternatively be performed with any other suitable temporal characteristics relative to other Blocks of the method 100.

Block S100 can include determining an object class, which functions to select a class of object to be included in the parametric scene generation (e.g., in accordance with one or more variations of Block S200). Block S100 can include determining a set of object classes to be depicted in a 3D scene. Determining the set of object classes can include selecting from a predetermined list of possible object classes (e.g., automotive vehicles, pedestrians, light and/or human-powered vehicles, buildings, traffic signage or signals, road surfaces, vegetation, trees etc.). Determining the set of object classes can be based upon received instructions (e.g., user preferences, preferences of an entity requesting generation of a synthetic dataset, etc.), contextual information (e.g., the physical environment of which the synthetic image dataset is intended to be representative), or otherwise suitably determined with any other suitable basis. The set of object classes can be different for each scene, and can include various subsets of the list of possible or available object classes (e.g., wherein a first scene includes only automotive vehicles, and a second scene includes only traffic signage and buildings, etc.). The object classes are preferably associated with traffic objects (e.g., objects that are found in realistic environments traversed by a vehicle in typical vehicle operation scenarios), but can additionally or alternatively include any suitable three-dimensional objects that can be arranged within a virtual world (e.g., imaginary objects, objects having a low probability of occurrence in the real-world such as a large inflatable parade balloon, etc.). In some examples, the object classes defining the list of possible object classes for inclusion can be extracted from a real world dataset (e.g., via an object detection and classification process), such as a real world cityscape dataset; in such examples and related examples, determining the list of object classes can include replicating the list of object classes extracted, selecting a subset from among the extracted object classes (e.g., to increase the likelihood of low-probability object classes of appearing in the synthetic dataset), or otherwise suitably determining the object class or set of object classes for inclusion.

Block S100 can include defining a portion of the set of parameters associated with the object classes to be depicted in a scene. These parameters can include geometric parameters (e.g., size, three-dimensional position, three-dimensional orientation or attitude, etc.), selection parameters (e.g., wherein one or more object classes are associated with predetermined 3D models from which an instance of the object class to be included in a virtual scene is selected), a numerosity of one or more object classes, and any other suitable parameters describing the virtual arrangements and/or orientations of instances (e.g., objects) of the object classes to be included in a virtual scene (e.g., scene parameters).

Block S100 can, in variations, include determining an entire set of parameters defining a multidimensional parameter space that encompasses scene parameters, rendering parameters, and augmentation parameters. The parametrized variables (e.g., parameters) used in subsequent Blocks of the method can be known or determined prior to the generation of a scene (e.g., Block S200), rendering an image of the scene (e.g., Block S300), and/or augmenting of the image (e.g., Block S400); for example, prior to scene generation, Block S100 can include determining which augmentation parameters (e.g., camera exposure, scaling ranges, etc.) will sampled and used in generating the synthetic image dataset. However, in alternative variations, Block S100 can include determining any suitable subset of the set of parameters at any suitable relative time relative to other Blocks or portions of the method 100.

Block S100 includes determining a set of parameter values of the determined parameters (e.g., sampling a value of each of the set of parameters from a distribution function associated with each parameter and/or group of parameters). Parameters can include any quantifiable property of a virtual scene. Preferably, the parameters are related to driving-relevant environments (e.g., roadways and surrounding objects and scenery), but can additionally or alternatively be related to any suitable virtual environment (e.g., airplane landing and takeoff corridors, orbital trajectories, pedestrian routes, mixed use environments, etc.). Each parameter of the set of parameters can take on a value that is defined by a random variable, which can each be of several types: discretely valued (DV) random variables, stochastically valued (SV) random variables, and continuously valued (CV) random variables. DV parameters are preferably selected from a predetermined set or range (e.g., a set of discrete numerical values, a set of predetermined 3D model descriptions, etc.), but can be otherwise suitably determined. In a specific example, a DV parameter can be a vehicle object parameter, which can take on one of 30 predetermined values (e.g., 3D models of various vehicle types), and the parameter value can be sampled from the set of 30 3D models in order to maximize the coverage of the set within the generated scene. CV parameters are preferably determined from either a discrete or continuous distribution of values based on a randomized seed (e.g., computed as a pseudorandom number), but can be manually selected, automatically extracted from a map or image (e.g., of a real-world scene, of a physical location, of a manually or automatically detected edge case), or otherwise suitably determined. CV parameters are preferably computed from a continuous functional distribution (e.g., a single valued function), but can be otherwise suitably determined. In one example, DV parameters are determined for a set of candidate objects (e.g., pedestrians, roads, light source, etc.); and CV parameter values and SV parameter values are determined (e.g., selected, specified, received, randomly generated, etc.) for each candidate object to be included in the scene (e.g., based on a set of potential values associated with each candidate object). In a specific example, the discrete variables include: an overall number of pedestrians in the scene, a wet road surface, and light; the continuous variables include: the camera location (e.g., x/y/z), each pedestrian's height and pose, and the angle and magnitude of the light (e.g., into the camera); and the stochastic variables include: the pedestrian locations within the scene (e.g., wherein the stochastic variable can be changed between images to produce scenes with the desired parametric properties but with unique combinations).

Examples of parameters for which values are determined in Block S100 include: roadway numerosity and connectivity, roadway spacing (e.g., space between intersections, width of roadways, length of roadways, lane spacing on roadways, number of lanes, road width, etc.), ground and/or roadway surface properties (e.g., roughness, reflectivity, traffic markings, repair markings, material, moisture, etc.), sidewalk properties (e.g., presence or absence of sidewalks, curb height, width, surface properties, color, material, dirt amount, etc.), surrounding object properties (e.g., presence or absence of buildings, pedestrians, fences, cars, vegetation, etc.) and properties associated therewith (e.g., height, width, window height, depth, material, numerosity, color, surface characteristics, orientation, position, geometric model, type, count, etc.), objects on the roadway (e.g., motor vehicles, human-powered vehicles, sedans, vans, trucks, etc.) and properties associated therewith (e.g., numerosity, color, surface characteristics, orientation, position, etc.), lighting parameters (e.g., practical lighting such as traffic lights or street lights, atmospheric lighting, longitude and latitude dictating sun positions, direction, angle, intensity, color, cloud cover, etc.), or any other suitable parameter. Further examples of parameters can include absolute or relative amounts of object categories (e.g., proportion of buildings to pedestrians, of pedestrians to cars, cars to bicyclists, etc.), predetermined 3D model properties (e.g., width of a road model, number of lanes of a road model, whether there is a median present in the road model, etc.), and other object properties (e.g., number of floors of a building, architectural style of a building, setback from the street in relative or absolute dimensions corresponding to a virtual scene, etc.). Positions of each object can be defined by parameters (e.g., relative to camera position and orientation, relative to global coordinates, by specifying coordinates, heading, orientation, drag and drop, etc.). Objects that are defined by scene parameters can be made up of subobjects, which can have properties (e.g., defined by parameters, which can be the same parameters, similar parameters, or different parameters than the parent object) associated therewith. For example, a building object can include a footprint (e.g., defined by a DV parameter that can take on a value of a footprint selected from a set of predetermined building footprints) and a number of floors and windows, each of which can be defined by additional parameters. However, scene parameters can include any suitable parameters to define any suitable objects representable within a scene.

Block S100 is preferably performed prior to generating a scene, but can alternatively be performed concurrently with scene generation (e.g., real-time generation and/or rendering) or at any other suitable time. Preferably, a new set of parameter values is determined (e.g., sampled from an LDS) each time a scene is generated, and then a synthetic image is generated of the newly generated scene (e.g., wherein a camera angle and position is defined by a pair of parameter values that are sampled to maximize the coverage of the parameter space). Alternatively, a single scene is generated, and the parameters defining the viewpoint of a virtual camera (e.g., camera angle and position of the camera) can be changed within the scene to generate a set of synthetic images. However, Block S100 can have any other suitable temporal characteristics.

The output(s) of Block S100 preferably include the definition of each object property (e.g., defined by parameter values) as well as the layout of each object within the scene (e.g., defined by parameter values), which can be used to generate the three dimensional virtual representation in Block S200.

Figure 2:
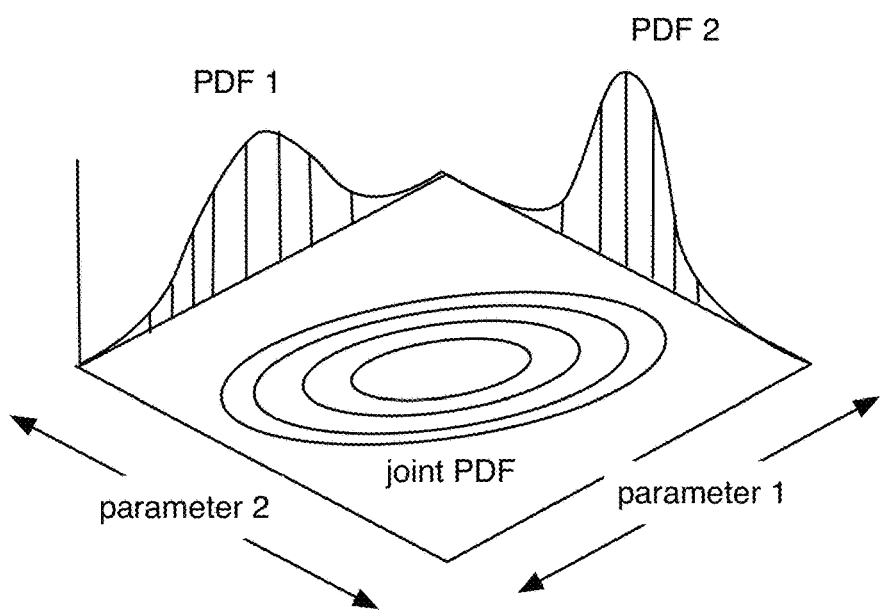
FIG. 2 depicts an example of a joint probability distribution function of a pair of parameters associated with an example implementation of the method.

Block S100 preferably includes determining a probability density function (PDF) for each parameter of the set of parameters, and sampling the PDF to obtain the value of the parameter (e.g., the parameter value). Each parameter value preferably assumes a value within the range [0,1], and can be remapped after sampling to a range suitable for the property that the parameter describes (e.g., to a range of 0-8" for curb height, to a range of 15-50' for roadways, etc.). Alternatively, the parameters can assume a value within any suitable range. The PDF can be uniform (e.g., a line), normal (e.g., a Gaussian), discrete or continuous, or have any other suitable functional shape or mathematical properties. The PDFs of multiple parameters can be coupled together (e.g., to form a joint PDF as shown in FIG. 2). In a first variation, the PDF of each parameter can be selected by a user (e.g., via an explicit choice by a human operator, available variables that are selected manually for each scene, object, and/or set of objects, etc.). In a second variation, the PDF of each parameter (or of a subset of the set of parameters) can be a learned function that is based on the output of training a model on the synthetic dataset, a real dataset, and/or a combination of synthetic and real data (e.g., the PDF of one or more parameters can be tuned to improve the performance of the model).

Figure 6:
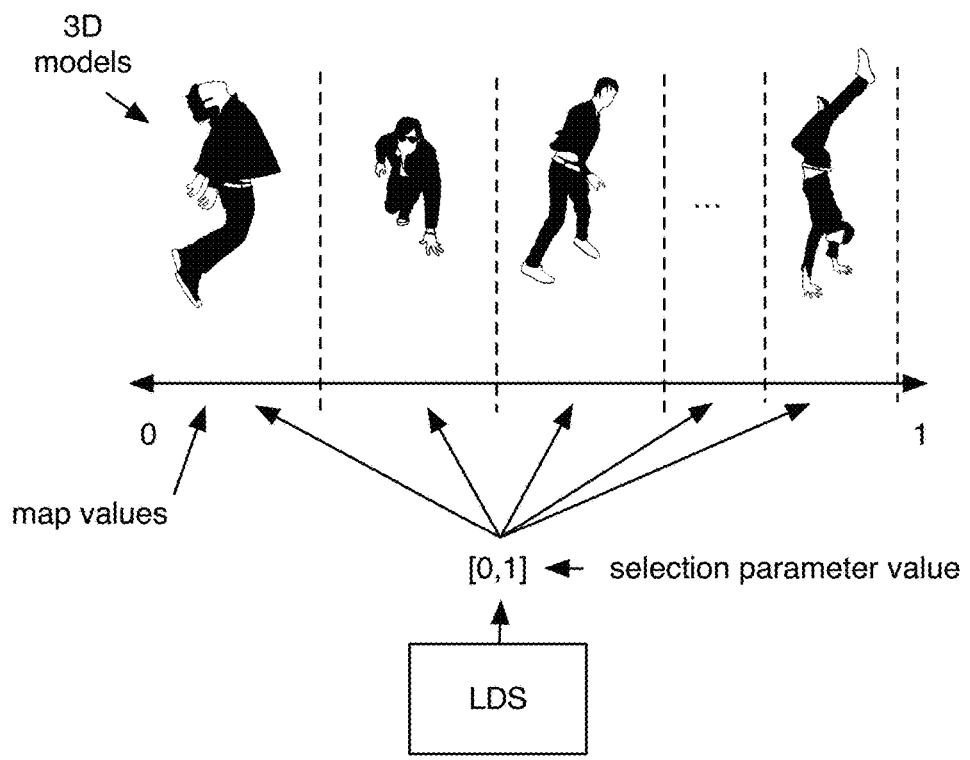
FIG. 6 depicts a schematic diagram of an example implementation of a portion of a variation of the method.

In variations, specific object classes can be associated with a plurality of predetermined 3D models. For example, a vehicle object class can include a set of 3D models of various vehicle makes (e.g., manufacturers), models (e.g., corresponding to specific models of a particular manufacturer), types (e.g., personal vehicles, commercial trucks, etc.), and the like. In another example, each time an instance of a car object is inserted into a scene or designated for inclusion in a scene, the instance can be chosen from a library of different types of cars (e.g., 200 types of cars, 50 types of cars, etc.). In another example, as shown in FIG. 6, Block S100 can include selecting a frame of an animation loop associated with an actor or animated person via a selection parameter sampled from an LDS, wherein each frame of the loop is associated with a map value, and matching the map value and the selection value selects the frame of the animation (e.g., 3D animation) for insertion into a scene. The set of 3D models can be mapped to a set of map values (e.g., within the range [0,1]) that can then be sampled from (e.g., based on matching a selection parameter value sampled from an LDS to a map value) to determine which of the set of 3D models to use for a particular instance of the object class. Some object classes of the set of object classes represented in a scene can be entirely prescribed by geometric parameters (e.g., height, width, depth, shape functions, etc.) whereas others (e.g., a subset of the set of object classes, a second set of object classes selected from the set of object classes, etc.) can correspond to associated sets of predetermined 3D models (e.g., associated with map values between 0 and 1 or with any other suitable map values that enable efficient selection of a predetermined 3D model from a set of available 3D models according to an LDS or other suitable sampling method).

Figure 3:
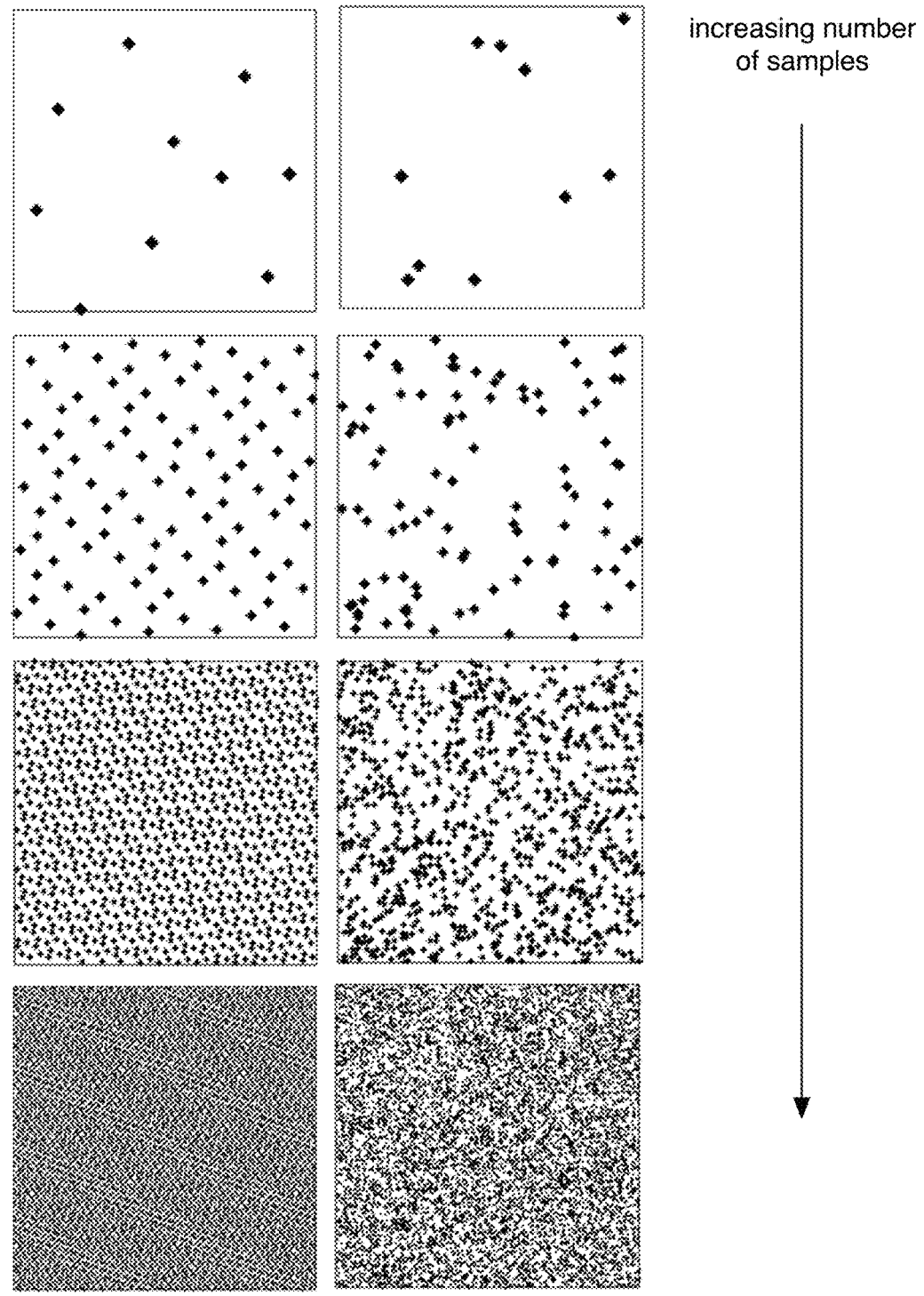
FIG. 3 depicts a comparison of a low-discrepancy sequence of subrandom points and a set of random points.

Each parameter value (e.g., of each parameter of the set of parameters, each geometric parameter, each selection parameter, each rendering parameter, each augmentation parameter, any other parameter associated with a variable of the 3D scene and related synthetic images, etc.) is preferably determined (e.g., sampled, selected, computed, generated) according to a low discrepancy sequence (LDS) that covers the range of possible and/or allowable parameter values. A suitable LDS preferably has the property that for all values of N, its subsequence $x_1, \ldots, x_N$ has a low discrepancy. An LDS may also be referred to as a quasi-random sequence or subrandom sequence. An LDS is preferably not a random sequence or a pseudorandom sequence, but can share some properties of random sequences. An LDS or equivalent set of points is preferably constructed such that for each additionally sampled point in the sequence, the coverage of the parameter space (e.g., allowable range of values of the parameter, [0,1], etc.) is maximized as compared to a similar random or pseudorandom sequence (see, e.g., FIG. 3). For example, the parameter value can be sampled from the PDF at a point corresponding to a Halton sequence, Sobol sequence, Faure sequence, Reverse Halton sequence, Niederreiter base 2 sequence, Niederreiter arbitrary base sequence, Poisson disk sampling, Hammersley set, van der Corput sequence, an additive recurrence sequence, a negatively correlated random number sequence, and/or any other suitably constructed LDS.

In variations, each LDS used in association with sampling any of the aforementioned parameters is a Sobol sequence. In alternative variations, a first LDS can be a Sobol sequence, a second LDS can be a Halton sequence, and a third LDS can be a Hammersley sequence. In some variations, the type of LDS can be determined based on the parameter type (e.g., a geometric parameter can be selected according to sampling of a Sobol sequence, a rendering parameter can be selected according to sampling of a Halton sequence, and an augmentation parameter can be selected according to a Hammersley sequence). However, sampling of parameter values can be otherwise suitably performed according to any suitable LDS sequence, other sequence, or continuous parametric function.

Alternatively, each parameter value can be determined by sampling the PDF with a random or pseudorandom sequence, using any suitable random or pseudorandom sampling technique.

In a specific example, a first instance of Block S100 includes determining a geometric parameter, wherein the geometric parameter defines a first parameter space, and sampling the first parameter space according to a first low discrepancy sequence (LDS) to generate a geometric parameter value. In this specific example, a second instance of Block S100 includes determining a rendering parameter, wherein the rendering parameter defines a second parameter space, and sampling the second parameter space according to a second LDS to generate a rendering parameter value. In this specific example, a third instance of Block S100 includes determining an augmentation parameter, wherein the augmentation parameter defines a third parameter space, and sampling the third parameter space according to a third LDS to generate an augmentation parameter value.

Block S100 can optionally include constraining parameter values and determining parameter values based on the constraint(s) (e.g., constrained values). For example, in a case wherein the parameter defines the orientation (e.g., heading) of an object, the orientation can be constrained to align substantially with a direction of traffic flow. In a related example, bicycle objects can be selected from a set of predetermined models (i.e., the bicycle objects types are a discrete variable) and then positioned along a defined roadway (e.g., stochastically by sampling a stochastic variable), but can take on an orientation defined by a continuous variable that is constrained to be no more than 5° from parallel with the traffic direction of the virtually defined roadway. However, the parameter values can be otherwise suitably constrained or unconstrained. Value constraints can include constraining a parameter resolution (e.g., limiting a resolution of one or more parameter spaces of a plurality of parameter spaces to reduce a dimensionality of the resulting synthetic image data set) to be below a threshold resolution (e.g., number of samples over the range of the parameter). In a specific example, Block S100 can include limiting a resolution of one or more parameters based on a computational constraint (e.g., defining a maximum resolution available for variation of one or more parameters). In another example, Block S100 can include limiting a resolution of one or more parameters based on a relative importance of each parameter (e.g., based on user preferences, third party recipient preferences, frequency of one or more object classes in a real-world dataset wherein more frequently appearing object classes are varied at a higher resolution and vice versa, etc.). In another example, Block S100 can include selecting a subset of generated 3D scenes from which to render a plurality of 2D images (e.g., wherein the parameter for which resolution is limited is a selection parameter corresponding to the selection of a 3D scene for rendering). However, Block S100 can additionally or alternatively include otherwise suitably constraining one or more parameters.

In related variations, Block S100 can include constraining parameter values based on extracted parameter ranges. In examples, the method can include extracting (e.g., from a real image dataset, from a database, etc.) a set of parameter ranges (e.g., maximum and minimum parameter values in a real image dataset) and constraining parameter values (e.g., sampled from an LDS) to fall within the extracted parameter range (e.g., by remapping the sampled LDS value to be between the minimum and maximum values of the range). In a specific example, the minimum and maximum camera exposure can be extracted from a real-image dataset, and an augmentation parameter defining a camera exposure (e.g., image brightness and/or contrast) can be constrained to fall between the minimum and maximum camera exposure upon sampling the parameter value from an LDS.

Block S100 can optionally include grouping parameters, and determining the values of the grouped parameters (e.g., by sampling an LDS to map a single sampled value of the LDS onto a coupled parameter values corresponding to a group of parameters). Grouping parameters functions to reduce the dimensionality of the parameter space, and can also function to separate groups of variables from one another in cases wherein certain parameters are not suitable for combination into a joint PDF. The grouped parameters can be: related, unrelated, the varied parameters (e.g., randomized parameters, parameters for which random values are determined), a varied parameter with a set of static parameters, parameters selected by a user, randomly selected parameters, or be any suitable set of parameters. In a first example, in a case where a scene includes parameters that define a random viewpoint and a random position for a car object within the scene, two separate LDSs can be constructed wherein a first LDS includes a set of 3 parameters (e.g., variables) defining the viewpoint, and a second LDS includes a set of 2 parameters defining the car object (e.g., the two dimensional extent holding a third dimension constant). In alternative implementation of the above case, a single LDS having 5 dimensions (e.g., one corresponding to each parameter) can be constructed, and points of the parameter space sampled across the 5 dimensions to maximize coverage.

In variations of Block S100 including grouping parameters into parameter groups prior to sampling, the order of the groupings during the construction of the LDS is preferably randomly selected (e.g., such that 2 sets of 3D LDSs do not generate the same sequence). For example, a random digit offset of the sample index can be used to ensure randomization between LDS sampling. However, points can be selected from the grouped-parameter-based LDS according to any suitable decorrelating technique.

In variations of Block S100 including sampling of multiple parameters (e.g., sampling a multidimensional parameter space), decorrelating techniques can be used. For example, Block S100 can include applying a constant offset to an LDS when sampling values, and taking a new sample as equal to (LDS+offset) modulo 1.0, such that the sampled value is wrapped around in the [0 . . . 1] range (e.g., offsetting a sample index of each of a set of parameter values, map values, selection parameter values, etc., by a randomly generated digit or offset between sampling of each of the set of parameter values and each of the set of map values). In another example, the Cranley-Patterson Rotation technique can be used to offset the sampling of the LDS according to a random vector of offset values, and thereby decorrelate the sampling of the individual points of the LDS. For example, Block S100 can include sampling a multidimensional parameter space and performing a Cranley-Patterson rotation between at least two dimensions of the multidimensional parameter space during sampling.

3.2—Scene Generation

Block S200 includes generating a 3D scene based on parameter values (e.g., determined in accordance with one or more variations of Block S100). Block S200 functions to procedurally create a three dimensional virtual representation of an environment (e.g., a scene) based on the parameter values that control the implementation of the procedure (e.g., geometric parameter values, parameter values defining which object classes will be populated into a scene). Block S200 can also function to produce a realistic virtual scene, wherein realism in the overall scene composition, along with the geometric structure and the material properties of objects in the scene, is enforced by the parametrized rule set and parameter values (e.g., determined in an instance of Block S100). Block S200 is preferably performed subsequently to an instance of Block S100 and based on the parameter values determined therein, but can alternatively be performed at any suitable time and based on any suitable parameter values or procedural rules.

The output of Block S200 preferably includes a three dimensional virtual representation of a set of objects (e.g., a scene), the aspects of which are defined by the parameter values determined in Block S100. Each object in the scene generated in Block S200 is preferably automatically labeled with the parameter values used to generate the object (e.g., including the object class name, object type, material properties, etc.), and other suitable object metadata (e.g., sub-classification), in order to enable the synthetic image(s) generated in Block S300 to be used for supervised learning without additional labeling (e.g., the objects in the scene are preferably intrinsically labeled). However, the scene can alternatively not include the labels, include any suitable labels, or include labels to be used for any other suitable purpose.

In variations, Block S200 can include defining the set of parameters to vary as well as the rule set that translates the parameter values (e.g., sampled according to one or more variations of Block S100) into the scene arrangement. However, the set of parameters to vary can additionally or alternatively be defined prior to Block S200 (e.g., in an instance of Block S100) or at any other suitable time.

Block S200 preferably produces, as output, a plurality of synthesized virtual scenes. Scene synthesis in conjunction with the method 100 preferably includes a defined model of the 3D virtual scene (e.g., determined in accordance with one or more variations of Block S100) that contains the geometric description of objects in the scene, a set of materials describing the appearance of the objects, specifications of the light sources in the scene, and a virtual camera model; however, the model of the 3D virtual scene can additionally or alternatively include or omit any other suitable components or aspects (e.g., the virtual camera model can be defined when rendering a synthetic image). The geometry can be described and/or specified in terms of discretized rendering primitives (e.g., triangles, polygons, surface patches, etc.), or otherwise suitably described. The materials describing or defining the appearance of the objects preferably define how light interacts with surfaces and participating media (e.g., air or dust interposed between a virtual camera and surfaces), but can otherwise suitably define object properties. After generation, the scene is then virtually illuminated using a light source (e.g., a single light source, several light sources, etc.), and the composition of the rendered frame is defined by introducing a virtual camera.

In examples, Block S200 can include generating a plurality of 3D scenes (e.g., based on parameter values corresponding to geometric parameters). The plurality of 3D scenes can be parameterized (e.g., via a set of map values) such that one can be selected (e.g., according to one or more variations of Block S100) according to an LDS for rendering (e.g., according to one or more variations of Block S300).

In a first variation, Block S200 includes generating the geometry and layout of objects in a scene according to the set of parameter values associated with each object in the scene and the interconnectivity (e.g., relative arrangement) of the objects determined in Block S100. In a specific example, Block S200 includes selecting object geometry of each object from a geometry database (e.g., a database of CAD models, geometry gathered from real-world examples of objects in the form of images, etc.) and arranging the objects (e.g., rendered using the selected geometry) within a virtual space based on a pose parameter value (e.g., determined in a variation of Block S100). In another specific example, Block S200 includes placing an object in a 3D scene, wherein the object is an instance of an object class, based on the geometric parameter value (e.g., defining a spacing of the placed object relative to previously placed objects, defining the angular orientation of the object, etc.). In another specific example, Block S200 can include simultaneously placing a plurality of objects into a 3D scene (e.g., generating a 3D scene composed of a plurality of objects).

In variations, the 3D scene generated in accordance with Block S200 can include a mixture of both procedurally generated geometry, as well as model libraries (E.g., sets of predetermined 3D models associated with some object classes). For example, the buildings, road surface, sidewalks, traffic lights and poles can be entirely procedurally generated and/or individually unique (e.g., within a given scene, across a plurality of generated scenes, etc.), whereas model libraries can be used to select pedestrian, bicyclist, car and traffic sign objects (e.g., wherein the geometry can shared between all instances of these object classes, and properties such as placement, orientation and certain texture and material aspects can vary between instances and be generated based on values determined via LDS sampling according to a variation of Block S100).

In variations of Block S200, generating the 3D scene can include determining and/or executing a rule set that includes contextual arrangements and requirements between objects. For example, the rule set can constrain pedestrian objects to be placed in crosswalks, and/or utilize a PDF that is weighted towards placement of pedestrians in a crosswalk with higher likelihood than placement outside of a crosswalk. In another example, the rule set can constrain vehicles to be placed in a roadway while allowing lateral placement, lane placement, and/or direction to vary within respective parameter spaces or ranges. The rule set can additionally or alternatively include any other suitable rules or constraints around the placement or arrangement of objects in the 3D scene.

Block S200 can include specifying an illumination of the 3D scene. In examples, the illumination of the scene can be specified by a sun position (e.g., determined via a constrained LDS sampling) and can include a parametrized depiction of the sky (e.g., including cloud cover, air quality index, airborne particulates, etc.). Parametric specification of the illumination functions to provide lighting conditions (e.g., at street level) within the 3D scene that include a continuous range of times of day, all potential light directions (e.g., relative to the ego vehicle, the virtual camera, etc.), as well as indirect light due to clouds and other participating media and/or light sources. In examples, calculating the illumination of objects in the scene in accordance with Block S200 can be performed in a high dynamic range, scene-referred linear RGB color space to provide realistic light and contrast conditions for a virtual camera. However, the illumination can be otherwise suitably calculated.

Block S200 preferably includes instantiating a unique virtual world for a given image (e.g., in lieu of synthesizing a plurality of images of a virtual world that extends beyond the composition of a frame). This can be made computationally efficient by generating the set of geometry that is visible either directly to the virtual camera, or through reflections and shadows cast into the view of the virtual camera, without generating a virtual world that extends beyond this limited scope (e.g., limited by the viewability of the scene by a virtual camera).

3.3—Image Rendering

Block S300 includes generating a synthetic image of the generated scene, which functions to create a realistic synthetic two-dimensional (2D) representation of objects in the scene, wherein the objects are intrinsically labeled with the parameter values used to generate the scene (e.g., the objects in the scene, object classifications, the layout of the objects, all other parametrized metadata, etc.). Block S300 can also function to enhance realism in the illumination and material interactions in the final synthetic image dataset by implementing physically based light transport simulation. Block S300 can also function to produce realistic synthetic images with pixel-perfect ground truth annotations and/or labels (e.g., of what each object should be classified as, to any suitable level of subclassification and/or including any suitable geometric parameter, such as pose, heading, position, orientation, etc.). Block S300 is preferably performed based on a set of rendering parameters (e.g., determined in accordance with an instance of a variation of Block S100), but can additionally or alternatively be performed based on a fixed set of rendering rules or procedures. Block S300 is preferably performed by a virtual camera, wherein the viewpoint of the virtual camera is determined as a parameter value in a variation of Block S100 (e.g., as a rendering parameter). Generating the synthetic image preferably includes generating a projection of the 3D scene onto a 2D virtual image plane at a predetermined location in the 3D scene (e.g., at the virtual camera location).

In a specific example, Block S300 can include: stochastically generating sample paths of virtual light rays in the image plane and tracing the sample paths through the 3D scene. The sample paths can be generated according to sampling of an LDS, a random sequence, or any other suitable sampling technique. At each interaction between the sample paths and objects in the scene, light virtually scattered by the emitting objects are sampled and their contributions summed up. This technique can provide accurate simulation of sensor characteristics and the color filter array (CFA), the effect of the optical system (point spread function/PSF, distortion, etc.), complex geometries and scattering at surface and in participating media. This technique can also be parallelized and scaled efficiently, and enhanced through Monte Carlo importance-sampling techniques (e.g., quasi-Monte Carlo methods, importance-weighted sampling method, LDS sampling methods, etc.). In another specific example, the synthetic image can be generated by performing ray tracing between the predetermined location and the objects of the scene. In another example, the synthetic image can be generated by topographically remapping the surfaces of the 3D scene onto a 2D surface. In another example, Block S300 can be performed using Monte Carlo-based light transport simulation coupled with simulation of virtual optics and sensors (e.g., camera lenses, CCD image sensors, etc.) to produce realistic images. In another example, Block S300 can include capturing a two-dimensional projection of a generated 3D scene (e.g., with or without incorporating realistic lighting effects and/or other light transport simulation). However, Block S300 can be otherwise suitably implemented using any other suitable synthetic image generation technique.

Examples of parameters on which rendering can be based (e.g., rendering parameters, determined and/or sampled according to one or more variations of Block S100) include: natural light source parameters (e.g., sun direction and height, time of day simulation, etc.), practical light source parameters (e.g., intensity of car headlights, street lights, building lights, etc.), environmental atmospheric parameters that can affect lighting (e.g., cloud cover, fog density, smoke, air quality, etc.), attributes of the 3D models that affect light behaviors (e.g., material type, textural variation, clean vs. rusty vs. dusty vehicles or other objects, concrete vs. asphalt road, object colors or markings or patterns, etc.), camera and/or lens parameters associated with a virtual camera or other image sensor (e.g., view direction angle, field of view, focal length, lens distortion, aberrations, etc.), and any other suitable parameters related to image rendering. In some examples, some of the aforementioned parameters can be changed in subsequent Blocks of the method 100 (e.g., during augmentation in accordance with one or more variations of Block S400).

Determining rendering parameters can include selecting one of a plurality of 3D scenes (e.g., according to a selection parameter value compared against a map value as described in relation to Block S100), and rendering a synthetic image of one of the plurality of 3D scenes based on the selection, to efficiently cover the set of generated scenes.

The output of Block S300 preferably includes a two dimensional synthetic image that realistically depicts a realistic 3D scene. The synthetic image defines a set of pixels, and each pixel is preferably labeled with the object depicted by the pixel (e.g., intrinsically labeled based on the parameters used to generate the object rendered in the image). In this manner, a "pixel-perfect" intrinsically annotated synthetic image can be created. In alternative variations, labelling can be performed on a basis other than a pixel-by-pixel basis; for example, labelling can include automatically generating a bounding box around objects depicted in the image, a bounding polygon of any other suitable shape, a centroid point, a silhouette or outline, a floating label, and any other suitable annotation, wherein the annotation includes label metadata such as the object class and/or other object metadata. Preferably, labelling is performed automatically (e.g., to generate an automatically semantically segmented image); however, labelling can additionally or alternatively be performed manually or semi-manually (e.g., wherein a user or operator specifies which objects to label and the pixels are automatically labeled if they depict a specified object, wherein a user can click on an object in the image and a bounding shape is automatically generated about the object, etc.); for example, a user can specify that pixels depicting vehicles are labeled with metadata describing the vehicle type, material properties, and the like, and that pixels that do not depict a vehicle remain unlabeled. Semantic segmentation can be performed with any suitable level of granularity, and labeled or annotated pixels can be grouped by any category or subcategory of label or annotation (e.g., defined by the parameters used to procedurally define the scene in the image) in producing a segmentation of the image. For example, pixels can be semantically segmented by object class, object subclass, orientation, any other suitable geometric or other parameter as determined in accordance with one or more variations of Block S100, and/or any suitable combination of the aforementioned. However, Block S300 can additionally or alternatively include any suitable output.

3.4—Image Augmentation

The method can optionally include Block S400, which includes augmenting the synthetic image. Block S400 functions to modify the image after rendering. Block S400 can also function to reduce the tendency of models to overfit the synthetic image data when the synthetic image data is used as a training data set, by increasing the degree of variation of the training data (e.g., wherein variations are added to each synthetic image to create multiple augmented synthetic images, before the resulting augmented images are passed to the network or model as training data). Thus, Block S400 can also function to reduce the size of the dataset that can be needed to achieve a desired level of model performance. Block S400 can also function to enhance the realism of the synthetic image by implementing modeled optical effects (e.g., using point spread functions in the image domain). Block S400 is preferably performed based on a set of augmentation parameters, which are preferably determined and sampled in accordance with an instance of Block S100; however augmentation can be otherwise suitably performed with any other suitable basis.

Augmentation parameters used to vary (e.g., augment) the images in accordance with Block S400 can include: translation parameters (e.g., translations in x or y directions of a subframe of an image frame), scale parameters (e.g., zooming a subframe of an image frame), brightness and contrast parameters, and any other suitable parameters that can affect the visible qualities of the synthetic image. The determination and sampling of the augmentation parameters are preferably performed in the manner as described above in relation to Block S100 (e.g., sampling the value of each augmentation parameter from an LDS, sampling the values of an augmentation parameter group from an LDS, etc.) to reduce unintended and/or undesired correlation across the synthetic image dataset between samples of augmentation parameters to generate augmentation parameter values; however, values of the augmentation parameters can be otherwise suitably determined.

Examples of parameters on which augmentation can be based (e.g., utilized to augment a synthetic image) include: image transformation parameters (e.g., brightness, dynamic range, etc.), geometric transformation parameters (e.g., governing translation, rotation, scaling, flipping, etc.), optical simulation parameters (e.g., governing lens properties, parametrized optical distortions related to virtual lenses or other media, lens flare, chromatic aberrations, other aberrations, PSF shape, etc.), simulated sensor or camera parameters (e.g., governing exposure level, sensor dynamic range, sensor black level, light response curve, static noise, temporal noise, shot noise, photon noise, color filter array/CFA arrangement, CFA filter characteristics, demosaicing, etc.), and any other suitable parameters related to varying or altering the synthetic image subsequent to rendering. Any of the aforementioned parameters can be defined according to a parametric function governing the associated property of the image, and the value can be sampled from an LDS (e.g., according to one or more variations of Block S100) to generate an augmentation parameter value used to augment the synthetic image in Block S400.

In variations, augmentation parameter ranges can be applied to augmentation parameters prior to value determination (e.g., sampling). For example, maxima and minima associated with various parameters can be extracted from a real-world image dataset (e.g., maximum camera exposure, minimum camera exposure, maximum and minimum sensor noise, etc.), and used to bound varied augmentation parameters to provide efficient coverage of the real-world parameter space (e.g., via LDS sampling) in the synthetic image dataset. In another example, a third party can define sensor characteristic ranges and provide the ranges as an input to the method, and Block S400 can include augmenting the synthetic image dataset to simulate the sensor performance via parametric variation of the augmentation parameters. However, in additional or alternative variations, augmentation parameter values can be determined and applied to augment synthetic images while applying any suitable constraints or parameter ranges in any suitable manner.

In variations, the method can omit Block S400 for one or more images that are ultimately combined into a synthetic image dataset (e.g., in Block S500). For example, the method can include augmenting a subset of a total number of synthetic images and leaving a second subset un-augmented. In another example, the method can include generating the synthetic image dataset without augmenting any of the images after rendering.

3.5—Dataset Generation

Block S500 includes generating a synthetic image dataset. Block S500 functions to output a synthetic image dataset, made up of intrinsically labelled images, as a result of the procedural generation, rendering, and/or augmentation Blocks of the method, for use in downstream applications (e.g., model training, model evaluation, image capture methodology validation, etc.). Block S500 can thus also include combining a plurality of images into dataset (e.g., made up of the plurality of images). Block S500 can include repeating Blocks S100, S200, S300, and S400 to build up a synthetic dataset of synthetic images. Repetition of the aforementioned Blocks can be performed any suitable number of times, to produce a synthetic image dataset of any suitable size. The predetermined number of iterations can be: selected by a user (e.g., an end user of the dataset), based upon the parameter ranges of one or more parameters (e.g., wherein a larger parameter range can correspond to a larger number of iterations and larger resulting dataset, to prevent sparse sampling).

Block S500 can include combining synthetic and real images into a combined image dataset. The combined image dataset can have various relative percentages of synthetic versus real images (e.g., 50% synthetic and 50% real, 20% synthetic and 80% real, 90% synthetic and 10% real, etc.); in some variations, the relative percentages can be determined based on the end-use application (e.g., for cases wherein the end-use application includes evaluating a model that was trained on real-world data, a large percentage of synthetic data can be used to artificially increase the percentage of "edge cases" presented by the evaluation data), based on the desired dataset size (e.g., wherein there are insufficient real images to provide an adequate desired dataset size, and the remainder are produced via synthetic image generation), or otherwise suitably determined.

Block S500 can include reordering images (e.g., from the order in which the synthetic images were produced in cases wherein the images are produced sequentially, from an initial ordering, etc.) to prevent model hysteresis during training (e.g., wherein trained model outputs are dependent upon the order of presentation of images during training). Reordering the images can include tagging each of a set of images with an ordering parameter (e.g., a sequential ordering parameter), the value of which can be randomly generated, sampled from an LDS, or otherwise suitably determined.

In a first variation, all the parameters defining the final image (e.g., scene generation parameters associated with Block S200, rendering parameters associated with Block S300, and augmentation parameters associated with Block S400) are varied (e.g., resampled from an LDS, determined in accordance with one or more variations of Block S100 in multiple instances) for each synthetic image. By utilizing an LDS to determine the parameter values anew for each image, this variation preferably maximizes the variation among the set of images generated, given a set of parameters to vary. Alternatively, the variation may not be maximized, and/or an LDS may not be utilized, for applications wherein the widest variation is not desired (e.g., wherein a constrained set of synthetic image parameters is desired). In a second variation, a single scene parameter is varied (e.g., resampled from an LDS) and the remainder are held constant during synthetic image generation. Preferably, in the second variation, the single parameter varied is not the camera position (e.g., viewpoint); alternatively, the single parameter can be the camera position. However, the synthetic image dataset can be otherwise suitably generated from one or more synthetic images.

3.6—Model Training

The method can include Block S600, which includes training a model based on the synthetic image dataset. Block S600 functions to train a learning model (e.g., an ML model, a synthetic neural network, a computational network, etc.) using supervised learning, based on the intrinsically labeled synthetic image dataset. Block S600 can function to modify a model to recognize objects (e.g., classify objects, detect objects, etc.) depicted in images with an improved accuracy (e.g., as compared to an initial accuracy, a threshold accuracy, a baseline accuracy, etc.). Block S600 can also function to augment a model trained on real-world data with synthetic data representative of "edge cases" (e.g., rare events that occur at low frequency, or not at all, in real-world data sets). Block S600 is preferably based on the synthetic dataset having intrinsic labels (e.g., object metadata embedded as a result of procedural scene generation), but can additionally or alternatively be based on any suitable data having any other suitable labels. The types of models trained in Block S600 can include one or more of: supervised learning models based on empirical risk minimization, structural risk minimization, generative training, and any other suitable learning models. Approaches to train the models can include: analytical learning, artificial NN (e.g., CNN), back-propagation, boosting, Bayesian statistics, case-based reasoning, decision tree learning, inductive logic programming, Gaussian process regression, group method of data handling, kernel estimators, learning automata, learning classifier systems, minimum-message-length estimation, multilinear subspace learning, Naive Bayes classifier, maximum entropy classifier, conditional random field, nearest neighbor algorithm, probably approximately correct learning, ripple down rules, symbolic machine learning algorithms, subsymbolic machine learning algorithms, support vector machines, minimum complexity machines, random forests, ensembles of classifiers, ordinal classification, data pre-processing, imbalanced dataset handling, statistical relational learning, fuzzy classification algorithms, and any other suitable approaches. Alternatively, models can be trained utilizing unsupervised learning, and/or any other suitable learning process.

In a specific example, the method includes training a dilated fully convolutional network (DFCN) using a synthetic image dataset produced in accordance with Blocks S100-S500, and a real-image dataset (e.g., organic data). The DFCN can be trained using stochastic gradient descent with a learning rate of $10^{-5}$, momentum of 0.99 and a batch size of 8 (e.g., for synthetic image data samples). For organic data, a learning rate of $10^{-4}$ can be used in baseline training and $10^{-5}$ in fine-tuning, with the same momentum and batch size. However, any suitable learning rate, momentum, and/or batch size can be used in training a DFCN. In this example, 40K iterations can be used during frontend baseline training, looK iterations for frontend fine tuning and 60K iterations for context baseline training; however, any suitable number of iterations can be used for any suitable training portion in related examples.

In another specific example, the method includes training a full-resolution residual network (FRRN). This network can be trained with no weight initialization, using the same dataset combinations as above in relation to the DFCN. The FRRN can be trained with a learning rate of $10^{-3}$ for organic data and $10^{-4}$ for synthetic data. The bootstrap window size can be set to any suitable sample length (e.g., 512 for organic data, 8192 for synthetic data, etc.). The batch size is preferably 3, but can additionally or alternatively be any suitable size. In this example, 100K iterations can be used both during baseline training and fine tuning, but in related examples any suitable number of iterations can be used.

3.7—Model Evaluation

The method can include Block S700, which includes evaluating a model based on the synthetic image dataset. Block S700 can include generating a performance metric that quantifies the performance of the model at various tasks (e.g., object classification, object detection, etc.) using the synthetic dataset as an input. Block S700 functions to test that a previously trained model performs as desired, required, and/or expected when provided with the synthetic dataset as an input. Block S700 is preferably performed after a model is trained on a dataset distinct from the synthetic dataset generated in Block S135 (e.g., another synthetic dataset generated in another instance of Block S135, a real-world dataset, etc.). Block S700 is also preferably based on a synthetic dataset with intrinsic labels (e.g., object metadata embedded as a result of scene generation). However, Block S700 can be otherwise performed at any suitable time and based on any suitable dataset (e.g., a synthetic dataset generated in the same instance of Block S135) having any suitable labels (e.g., manually generated labels, no labels, etc.).

In a first variation, Block S700 can include validating that the output of a model is consistent for identical and/or similar inputs. For example, a machine learning model (e.g., a CNN) for classifying vehicle types and behaviors is trained on a standardized real-world traffic-environment dataset. In this variation of Block S700, the model is provided a synthetic dataset generated in accordance with a variation of the method as an input, wherein the synthetic dataset includes images of objects (e.g., of similar types as those in the real-world dataset) that are programmatically generated so as to provide the widest possible range of underlying parameter values in the fewest number of synthetic image frames. The output of the model for the synthetic dataset is then compared to the ground truth (e.g., the intrinsic labels) of the synthetic dataset, and the consistency of the model is thus determined based on the comparison. However, validating the model output using a synthetic image dataset can be otherwise suitably performed.

Block S700 can include evaluating the comparative performance (e.g., in object detection, classification, etc.) of a model trained utilizing synthetic data alone versus utilizing organic or real-image data, or real-image data in combination with synthetic data.

In relation to Block S700, evaluated performance can be quantified using the intersection over union (IoU) metric (e.g., for object classification), mean squared error (MSE) metric, root MSE metric, squared error metric, prediction confidence interval metrics, precision metrics, recall metrics, lift scores or lift metrics, accuracy metrics, loss metrics, and/or any other suitable network performance metrics.

In variations, Block S700 can include generating a performance metric that is used to modify the synthetic image dataset (e.g., wherein the synthetic image dataset is modified based on the relationship between the performance metric and a threshold). For example, the method can include generating additional synthetic images (e.g., according to variations of Blocks S100-S400) based on the performance metric falling beneath a threshold, combining the additional synthetic images with the synthetic image dataset (e.g., adding images, replacing existing images randomly, non-randomly, etc.), until the performance metric exceeds the threshold (e.g., based on subsequent and iterative model evaluation). However, the synthetic image dataset can additionally or alternatively be modified in any suitable manner based on the performance metric (e.g., augmented, re-rendered, re-generated, etc.).

3.8—Additional Method Examples

Figure 4:
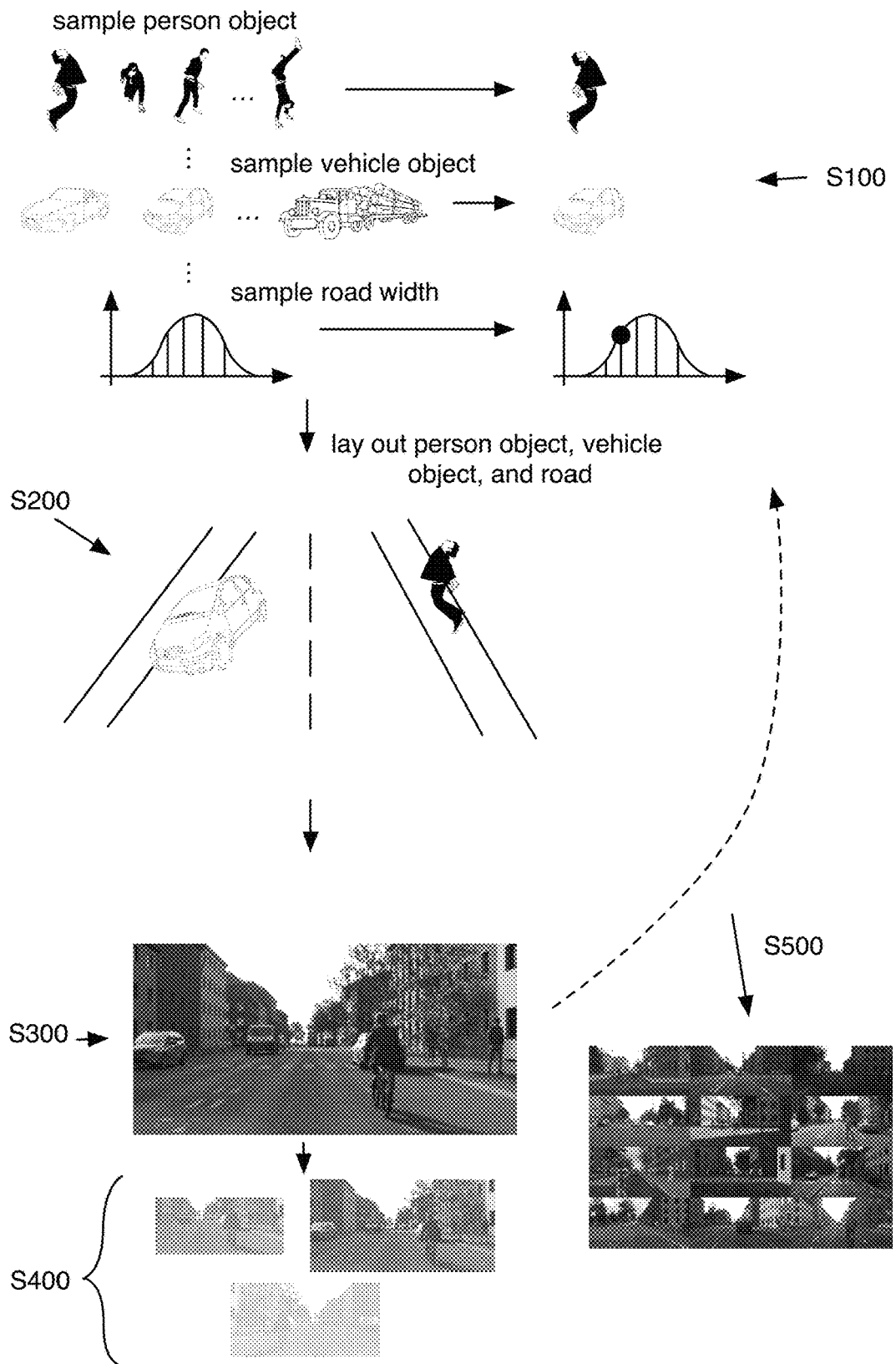
FIG. 4 depicts a schematic illustration of an example implementation of the method.

In a first specific example implementation of the method, as shown in FIG. 4, a set of parameter values is determined. Determining the parameter values in this example includes: computing a ground surface parameter based on a stochastic variable (e.g., fractal noise); constructing a graph network made up of a set of graph vertices and edges representative of a road network; determining the type of road markings (e.g., as a discrete variable), the amount of weathering and/or wear of the road (e.g., as a continuous variable), and the material properties of the road (e.g., as a continuous variable); generating a set of virtual buildings by positioning a footprint (e.g., selected from a set of predetermined building footprints) adjacent to the virtual roadway, determining the number of floors (e.g., as a discrete variable), height of each floor (e.g., as a continuous variable), the number of windows per floor (e.g., as a discrete variable), and the size of each window (e.g., as a continuous variable); selecting a number of pedestrians (e.g., as a discrete variable), selecting (for each of the number of pedestrians) one out of a set of predetermined 3D pedestrian models (e.g., as a discrete variable), orienting and positioning each individual pedestrian model (e.g., as continuous and stochastic variables, respectively); selecting a number of cars, bicyclists, trucks, and buses (e.g., as a discrete variable), selecting (for each vehicle) one out of a set of predetermined 3D models (e.g., as a discrete variable), positioning (e.g., as a stochastic variable) each individual vehicle in an orientation dependent on the traffic flow at each position (e.g., a truck on the righthand side of the virtual road is oriented substantially parallel with and facing the direction of proper traffic flow); selecting a number of trees, street lights, traffic signs, and traffic signals (e.g., as discrete variables), and repeating the parameter value determination for each of these types of objects; selecting a texture map of the virtual sky (e.g., as a discrete variable) and orienting the texture (e.g., as a continuous variable) to maximize coverage of the gamut of realistic lighting conditions; determining a virtual camera viewpoint to lie on an edge of the road network graph (e.g., as a discrete variable), and having a random position in the righthand lane of the virtual road network (e.g., as a stochastic variable).

In determining the parameter values described above in the first specific example, each value is sampled from an N-dimensional LDS, wherein N is equal to the number of parameters. However, in related example implementations, multiple M-dimensional LDSs can be used to sample the parameter values, wherein M is equal to the number of parameters in subsets (e.g., groups) of the total number of parameters. Subsets of the parameters need not be of the same size, but can additionally or alternatively be of the same size (e.g., number of parameters in each subset).

Generating the scene in this example includes: rendering the ground surface, superimposing the road graph onto the ground surface (e.g., using the defined number of lanes as a discrete variable, the road width as a continuous variable, the presence or absence of a median and parking spaces as discrete variables, and integrating the sampled values into the generation of the road graph network); rendering each building according to the determined building parameters; rendering the set of virtual pedestrians based on the determined pedestrian parameters; and rendering the vehicles, trees, street lights, traffic signs, traffic signals, virtual sky, etc., according to the determined parameter values for the respective objects. This example of the method includes generating 25,000 synthetic images by repeating the determination of the parameter values according to the constructed LDS(s), and generating the scene anew according to the parameter values thus determined, and capturing a synthetic image (e.g., via a ray tracing technique between the virtual objects of the scene and the virtual camera viewpoint) of each instance of the generated scene. In related examples, the scene is generated fewer than 25,000 times, and at least two of the synthetic images are generated of the same generated scene. However, any suitable number of synthetic images can be generated based on any suitable number of generated scenes.

In a second specific example of the method, a synthetic image dataset is generated in accordance with a variation of the method. After generating the synthetic image dataset (e.g., by repeatedly performing variations of Blocks S100-S300), this example of the method includes testing a previously trained convolutional neural network (CNN) model that was trained to classify objects on and/or around a roadway (e.g., vehicles, pedestrians, background scenery, etc.). In this example, testing the model includes: providing the synthetic image dataset to the CNN as an input, classifying objects within the dataset using the model to generate a set of object labels, comparing the set of object labels output by the CNN to the predetermined (e.g., intrinsically known) labels of each object depicted in the synthetic image dataset, and evaluating the successful classification rate of the CNN based on the comparison between the set of object labels and the predetermined labels.

In a third specific example, the method includes determining an object class (e.g., for inclusion in a 3D scene); determining a geometric parameter (e.g., having a first parameter space); sampling the first parameter space according to a first low discrepancy sequence (LDS) to generate a geometric parameter value; generating a three-dimensional (3D) scene including an object (e.g., an instance of the determined object class) by arranging the object based on the geometric parameter value; determining a rendering parameter (e.g., having a second parameter space); sampling the second parameter space according to a second LDS to generate a rendering parameter value; rendering a synthetic image of the 3D scene (e.g., made up of a set of pixels, some of which depict the object) based on the rendering parameter value; automatically labelling each pixel depicting the object within the image with a label (e.g., labeling the object with its object class, other metadata, etc.); determining an augmentation parameter (e.g., having a third parameter space); sampling the third parameter space according to a third LDS to generate an augmentation parameter value; augmenting the synthetic image based on the augmentation parameter value to generate an augmented synthetic image; and combining the augmented synthetic image with a set of augmented synthetic images to generate a synthetic image dataset (e.g., made up of intrinsically labelled images).

In a fourth specific example, the method includes determining a set of parameters defining a multidimensional parameter space (e.g., including geometric parameters, rendering parameters, augmentation parameters, etc.); determining a set of parameter values corresponding to the set of parameters (e.g., via sampling the multidimensional parameter space according to an LDS); generating a plurality of 3D scenes using the parameter values (e.g., geometric parameter values); rendering a synthetic image of one of the plurality of 3D scenes using the set of parameter values (e.g., rendering parameter values), including selecting which of the 3D scenes to render based on one of the parameter values; augmenting the synthetic image using the parameter values (e.g., augmentation parameter values) to generate an augmented synthetic image; and combining the augmented synthetic image with a set of augmented synthetic images to generate a synthetic image dataset (e.g., wherein the set of augmented synthetic images is generated by repeatedly rendering and augmenting images of generated 3D scenes for a predetermined number of repetitions).

In a fifth specific example, the method includes selecting a first set of object classes associated with traffic objects; defining a set of geometric parameters associated with the first set of object classes; selecting a second set of object classes from the first set of object classes, wherein each of the second set of object classes corresponds to a set of predetermined 3D models associated with a map value (e.g., between 0 and 1); sampling a set of parameter values corresponding to the set of geometric parameters and a set of map values (e.g., according to an LDS); selecting one of the set of predetermined 3D models corresponding to each of the second set of object classes based on a corresponding map value; and generating a 3D scene, the composition (e.g., scene composition) of which includes a plurality of objects based on the set of parameter values, wherein each of the plurality of objects is an instance of the first set of object classes, wherein each of the plurality of objects is arranged within the 3D scene based on the set of parameter values of the set of geometric parameters, and wherein each of the plurality of objects corresponding to an instance of the second set of object classes is generated using one of the set of predetermined 3D models.

In examples, the method can be applied to produce synthetic data as an output of variations of Block S200, S300, and/or S400. For example, a set of scenes generated in accordance with one or more variations of Block S200 can be provided (e.g., to a third party) without subsequent image rendering and/or augmentation. In another example, a single static scene (e.g., of particular relevance to an end-user application) can be used to render many image variations, which can be augmented or left un-augmented post-rendering. In another example, stand-alone parameter exploration in the context of augmentation alone can be used (e.g., to train ML systems and models) with real data (e.g., to perform efficient coverage of the augmentation-specific parameter space and augment a real-image dataset using such efficiently determined augmentation parameters sampled using an LDS as in one or more variations of Block S100).

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of a processor and/or a controller 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various Blocks of the method 100 and/or associated physical components (e.g., processing systems, CPUs. GPUs, etc.). Blocks can be executed iteratively or serially. Blocks can be executed in any suitable order, and multiple instances of each Block can be executed in a single iteration of the method.

As a person skilled in the art of image analysis and synthetic image generation will recognize from the previous detailed description and from the figures and claims, modifications and changes can be made to the preferred embodiments of the invention without departing from the scope of this invention defined in the following claims.

What is claimed is:

1. A method for synthetic data generation and analysis comprising:
    determining an object class;
    determining a geometric parameter, wherein the geometric parameter defines a first parameter space;
    sampling the first parameter space according to a first low discrepancy sequence (LDS) to generate a geometric parameter value;
    generating a three-dimensional (3D) scene comprising an object, wherein the object is an instance of the object class, wherein generating the 3D scene comprises arranging the object based on the geometric parameter value;
    determining a rendering parameter, wherein the rendering parameter defines a second parameter space;
    sampling the second parameter space according to a second LDS to generate a rendering parameter value;
    rendering a synthetic image of the 3D scene based on the rendering parameter value, wherein the synthetic image defines a set of pixels and depicts the object within a subset of the set of pixels;
    automatically labelling each pixel of the subset of the set of pixels with a label defining the object class;
    determining an augmentation parameter, wherein the augmentation parameter defines a third parameter space;
    sampling the third parameter space according to a third LDS to generate an augmentation parameter value;
    augmenting the synthetic image based on the augmentation parameter value to generate an augmented synthetic image; and
    combining the augmented synthetic image with a set of augmented synthetic images to generate a synthetic image dataset comprising intrinsically labelled images.

2. The method of claim 1, further comprising limiting a resolution of at least one of the first parameter space, the second parameter space, and the third parameter space to reduce a dimensionality of the synthetic image data set.

3. The method of claim 2, further comprising training a machine-learning model, based on the intrinsically labeled images of the synthetic image dataset.

4. The method of claim 1, further comprising classifying objects depicted in the synthetic image dataset using a trained machine-learning model to generate a performance metric.

5. The method of claim 4, further comprising modifying the synthetic image dataset based on the performance metric.

6. The method of claim 1, wherein the first LDS comprises a first Sobol sequence, the second LDS comprises a second Sobol sequence, and the third LDS comprises a third Sobol sequence.

7. A method for synthetic data generation and analysis comprising:
    determining a set of parameters defining a multidimensional parameter space, wherein the set of parameters comprises a set of geometric parameters, a set of rendering parameters, and a set of augmentation parameters;
    determining a set of parameter values corresponding to the set of parameters, wherein determining the set of parameter values comprises sampling the multidimensional parameter space according to a low discrepancy sequence (LDS);
    generating a plurality of three-dimensional (3D) scenes based on the set of parameter values corresponding to the set of geometric parameters;
    rendering a synthetic image of one of the plurality of 3D scenes based on the set of parameter values corresponding to the set of rendering parameters, wherein at least one of the set of rendering parameters comprises a selection of one of the plurality of 3D scenes; and
    augmenting the synthetic image based on the set of parameter values corresponding to the set of augmentation parameters to generate an augmented synthetic image; and
    combining the augmented synthetic image with a set of augmented synthetic images, wherein the set of augmented synthetic images is generated by repeating rendering and augmenting synthetic images for a predetermined number of repetitions, to generate a synthetic image dataset.

8. The method of claim 7, further comprising classifying objects depicted in the synthetic image dataset using a trained machine-learning model to generate a performance metric.

9. The method of claim 7, wherein sampling the multidimensional parameter space comprises performing a Cranley-Patterson rotation between at least two dimensions of the multidimensional parameter space.

10. The method of claim 7, wherein the LDS comprises one of a Sobol sequence, a Halton sequence, and a Hammersley sequence.

11. The method of claim 7, further comprising combining the synthetic image dataset and a real image dataset.

12. The method of claim 11, further comprising training an object classification model based on the combination of the synthetic image dataset and the real image dataset.

13. A method for synthetic data generation and analysis comprising:
    selecting a first set of object classes associated with traffic objects;
    defining a set of geometric parameters associated with the first set of object classes;
    selecting a second set of object classes from the first set of object classes, wherein each of the second set of object classes corresponds to a set of predetermined three-dimensional (3D) models associated with a map value between 0 and 1;
    sampling a set of parameter values corresponding to the set of geometric parameters and a set of map values, wherein each of the set of parameter values and each of the set of map values is sampled according to a first low-discrepancy sequence (LDS);
    selecting one of the set of predetermined 3D models corresponding to each of the second set of object classes based on a corresponding map value; and
    generating a 3D scene composed of a plurality of objects based on the set of parameter values, wherein each of the plurality of objects comprises an instance of the first set of object classes, wherein each of the plurality of objects is arranged within the 3D scene based on the set of parameter values of the set of geometric parameters, and wherein each of the plurality of objects corresponding to an instance of the second set of object classes is generated based on the one of the set of predetermined 3D models corresponding to each of the second set of object classes.

14. The method of claim 13, further comprising offsetting a sample index of each of the set of parameter values and each of the set of map values by a randomly generated digit between sampling of each of the set of parameter values and each of the set of map values according to the first LDS.

15. The method of claim 13, wherein the LDS comprises one of a Sobol sequence, a Halton sequence, and a Hammersley sequence.

16. The method of claim 13, further comprising
defining a set of rendering parameters, and sampling the set of rendering parameters according to a second LDS to generate a set of rendering parameter values;
rendering a synthetic image of the 3D scene based on the set of rendering parameter values; and
combining the synthetic image with a set of synthetic images to generate a synthetic image dataset.

17. The method of claim 16, further comprising generating a plurality of 3D scenes, wherein one of the set of rendering parameters comprises a scene selection parameter, and selecting the 3D scene prior to rendering based on the scene selection parameter.

18. The method of claim 16, further comprising classifying objects depicted in the synthetic image dataset using a trained machine-learning model to generate a performance metric.

19. The method of claim 16, further comprising:
extracting, from a real image dataset, a set of augmentation parameter ranges corresponding to a set of augmentation parameters;
sampling the set of augmentation parameters according to a third LDS to generate a set of augmentation parameter values;
augmenting the synthetic image, prior to combining the synthetic image with the set of synthetic images, based on the set of augmentation parameter values to generate an augmented synthetic image; and
combining the augmented synthetic image with the set of synthetic images to generate the synthetic image dataset, wherein set of synthetic images comprises a set of augmented synthetic images.

20. The method of claim 19, further comprising training an object classification model based on a combination of the synthetic image dataset and the real image dataset.

* * * * *

(12) SUPPLEMENTAL EXAMINATION CERTIFICATE

United States Patent
Wrenninge et al.

(10) Number: US 10,235,601 F2
(45) Certificate Issued: Jan. 28, 2020

Control No.: 96/000,307

Filing Date: Dec. 18, 2019

Primary Examiner: Henry N. Tran

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2011/0002531 A1 | 1/2011 | Heisele et al. |
| 2014/0176551 A1 | 6/2014 | Heisele |
| 2014/0177911 A1 | 6/2014 | Heisele |
| 2016/0342861 A1 | 11/2016 | Tuzel et al. |
| 8,838,511 B2 | 9/2014 | Kristal et al. |

OTHER DOCUMENTS

1. Stephan R. Richter, et al.: "Playing for Data: Ground Truth from Computer Games", https://arxiv.org/pdf/1608.02192.pdf, August 7, 2016.

2. German Ros, et al.: "The Synthia Dataset: A Large Collection of Synthetic Images for Semantic Segmentation of Urban Scenes", 2016 IEEE Conference on Computer Vision and Pattern Recognition (CVPR), Las Vegas, NV, 2016, pp. 3234 – 3243.